United States Patent
Wojcik et al.

(10) Patent No.: US 11,528,256 B1
(45) Date of Patent: Dec. 13, 2022

(54) ANONYMIZATION SERVICE FOR SHARING IMAGES OR VIDEOS CAPTURING IDENTITY OF PERSONS

(71) Applicant: MOTOROLA SOLUTIONS, INC., Chicago, IL (US)

(72) Inventors: Leszek Wojcik, Cracow (PL); Robert Godula, Kaniow (PL); Grzegorz Chwierut, Cracow (PL); Lukasz Krecioch, Chocznia (PL); Marek Swierk, Tymbark (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/381,492

(22) Filed: Jul. 21, 2021

(51) Int. Cl.
*H04L 9/40* (2022.01)
*H04L 9/08* (2006.01)
*G06F 21/62* (2013.01)

(52) U.S. Cl.
CPC ...... *H04L 63/0407* (2013.01); *G06F 21/6254* (2013.01); *G06F 21/6263* (2013.01); *H04L 9/0825* (2013.01)

(58) Field of Classification Search
CPC ............... H04L 63/0407; H04L 9/0825; G06F 21/6254; G06F 21/6263
See application file for complete search history.

(56) References Cited

U.S. PATENT DOCUMENTS

| | | | |
|---|---|---|---|
| 7,003,117 B2 | 2/2006 | Kacker et al. | |
| 10,284,885 B1 * | 5/2019 | Borras | H04L 63/0428 |
| 10,572,684 B2 | 2/2020 | Lafever et al. | |

(Continued)

FOREIGN PATENT DOCUMENTS

| | | |
|---|---|---|
| EP | 1729242 A1 | 7/2009 |
| KR | 101583206 B1 | 1/2016 |

(Continued)

OTHER PUBLICATIONS

Fenghua Li et al: "A Privacy-Preserving Method for Photo Sharing in Instant Message Systems", Cryptography, Security and Privacy, ACM, 2 Penn Plaza, Suite 701 New York NY 10121-0701 USA, Mar. 17, 2017 (Mar. 17, 2017), pp. 38-43, XP058327681, DOI: 10.1145/3058060.3058081 ISBN : 978-1-4503-4867-6, all pages.

(Continued)

*Primary Examiner* — Thaddeus J Plecha
(74) *Attorney, Agent, or Firm* — Raguraman Kumaresan

(57) ABSTRACT

A process of requesting and providing an anonymization service for sharing images or videos capturing identity of persons. An anonymization server receives a request including information corresponding to an identifier identifying the image or the video, a region within the image or video in which an identity of a person is captured, an encryption key used to encrypt the region of the image or the video, and contact information of the person. When the anonymization server receives a request from the second agency to share an encryption key for decrypting the region, the server transmits a request to the person to provide a permission to deanonymize the identity of the person captured in the image or video. The anonymization server transmits a response including the encryption key to the second agency when a response indicating a permission is received from the person.

20 Claims, 9 Drawing Sheets

(56) References Cited

U.S. PATENT DOCUMENTS

| | | |
|---|---|---|
| 2008/0297586 A1 | 12/2008 | Kurtz et al. |
| 2015/0104103 A1 | 4/2015 | Candelore |
| 2015/0379303 A1 | 12/2015 | Lafever et al. |
| 2021/0392116 A1* | 12/2021 | Hsu ........................ H04N 7/183 |
| 2022/0029789 A1* | 1/2022 | Secomandi .......... G06V 40/172 |
| 2022/0129582 A1* | 4/2022 | Lange .................... G06F 16/48 |
| 2022/0207264 A1* | 6/2022 | Chen .................... G06K 9/6288 |

FOREIGN PATENT DOCUMENTS

| | | |
|---|---|---|
| WO | 2009124819 A1 | 10/2009 |
| WO | 2014173588 A1 | 10/2014 |

OTHER PUBLICATIONS

The International Search Report and the Written Opinion, corresponding patent application No. PCT/US2022/035417, filed Jun. 29, 2022, dated Oct. 12, 2022, all pages.

\* cited by examiner

500

510 — RECEIVE A REQUEST TO PROVIDE AN ANONYMIZATION SERVICE CORRESPONDING TO AN ENCRYPTED VERSION OF AN IMAGE OR A VIDEO TO BE SHARED BY A FIRST AGENCY WITH A SECOND AGENCY, THE REQUEST INCLUDING INFORMATION CORRESPONDING TO: (I) AN IDENTIFIER UNIQUELY IDENTIFYING THE IMAGE OR THE VIDEO, (II) A PARTICULAR REGION WITHIN AN UNENCRYPTED VERSION OF THE IMAGE OR THE VIDEO IN WHICH AN IDENTITY OF A PERSON IS CAPTURED, (III) AN ENCRYPTION KEY USED BY THE FIRST AGENCY TO ENCRYPT THE PARTICULAR REGION OF THE UNENCRYPTED VERSION OF THE IMAGE OR THE VIDEO TO ANONYMIZE THE IDENTITY OF THE PERSON IN THE ENCRYPTED VERSION OF THE IMAGE OR THE VIDEO, AND (IV) CONTACT INFORMATION ASSOCIATED WITH THE PERSON

520 — RECEIVE A REQUEST TO SHARE THE ENCRYPTION KEY FOR DECRYPTING THE PARTICULAR REGION IN THE ENCRYPTED VERSION OF THE IMAGE OR THE VIDEO, THE REQUEST INCLUDING INFORMATION CORRESPONDING TO THE IDENTIFIER UNIQUELY IDENTIFYING THE IMAGE OR THE VIDEO AND THE PARTICULAR REGION WITHIN THE IMAGE OR THE VIDEO

530 — DETERMINE THAT THE IDENTIFIER INCLUDED IN THE REQUEST RECEIVED FROM THE SECOND AGENCY MATCHES WITH THE IDENTIFIER INCLUDED IN THE REQUEST RECEIVED FROM THE FIRST AGENCY, AND RESPONSIVELY RETRIEVE CONTACT INFORMATION ASSOCIATED WITH THE PERSON BASED ON THE INFORMATION INCLUDED IN THE REQUEST CORRESPONDING TO THE PARTICULAR REGION

540 — TRANSMIT, BASED ON THE CONTACT INFORMATION ASSOCIATED WITH THE PERSON, A REQUEST TO THE PERSON TO PROVIDE A PERMISSION TO DEANONYMIZE THE IDENTITY OF THE PERSON CAPTURED IN THE IMAGE OR THE VIDEO

550 — TRANSMIT A RESPONSE INCLUDING THE ENCRYPTION KEY TO A COMPUTING DEVICE ASSOCIATED WITH THE SECOND AGENCY WHEN A RESPONSE INDICATING A PERMISSION IS RECEIVED FROM THE PERSON

*FIG. 5*

ANONYMIZATION SERVICE FOR SHARING IMAGES OR VIDEOS CAPTURING IDENTITY OF PERSONS

BACKGROUND

Organizations such as public safety agencies and private enterprises capture and store large amounts of videos and photos for investigation or record purposes. Many law enforcement agencies have adopted body-worn cameras for their officers to provide transparency into police interactions. Sometimes law enforcement agencies publicly release videos and images, for example, body-worn camera recordings of police-public confrontations. Also, many public and private organizations share videos and images captured by their surveillance cameras with other organizations for investigation or record purposes. Such videos and images frequently capture the identity of individuals who would want to control or restrict the use of or distribution of videos or images revealing their identity.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 5 illustrates a flowchart of a process for providing an anonymization service for sharing images or videos capturing identity of persons in accordance with some embodiments.

Figure 1:
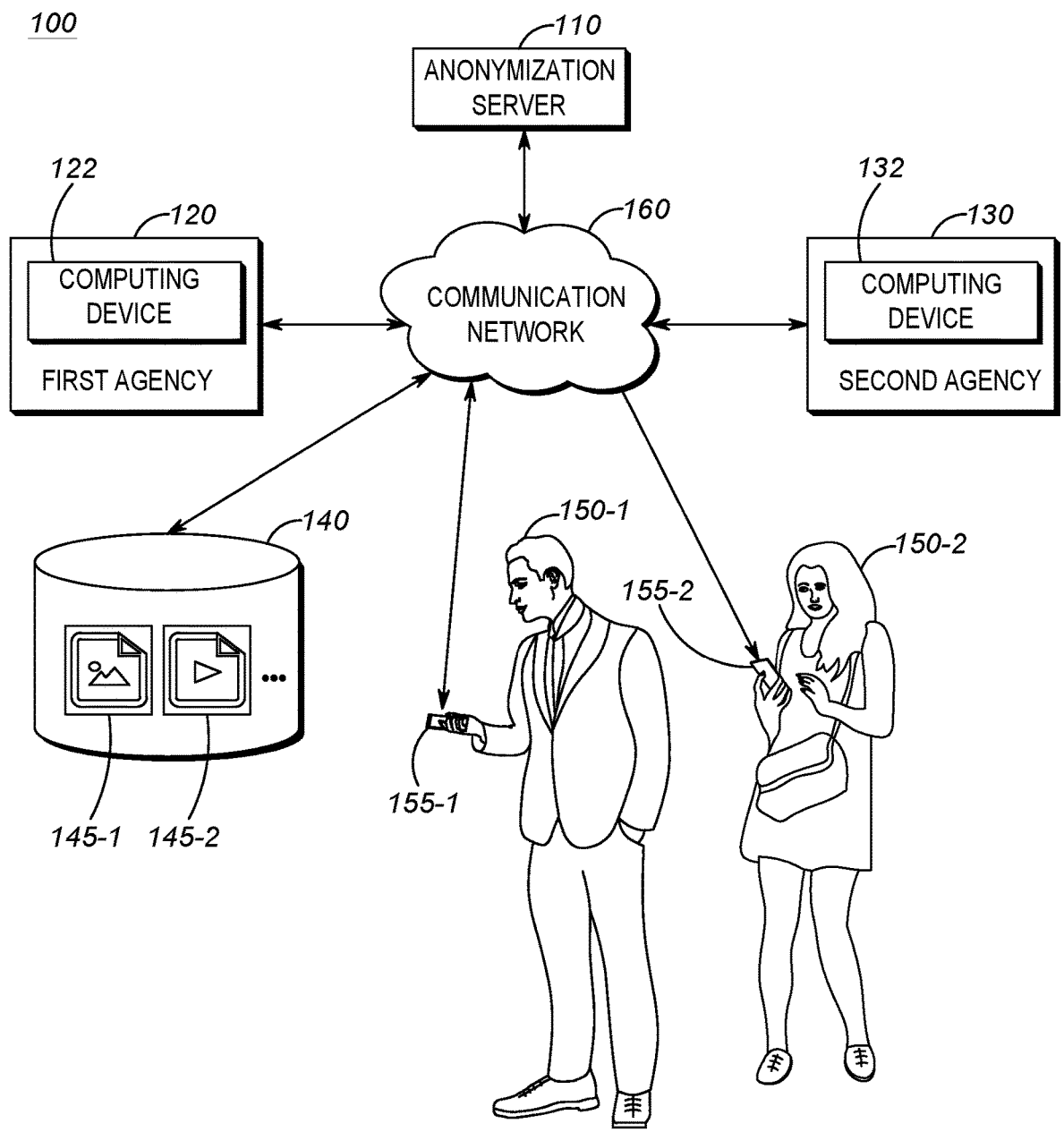
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, agencies often share videos or images owned by them with other agencies for investigation or record purposes. Also, sometimes agencies release the videos or images owned by them on public media (e.g., social media, press etc.,) to provide transparency into their investigation. However, such videos and images often capture the identity of private individuals who would want to control or restrict the use of videos and images in order to protect their privacy. Accordingly, there is a need for providing an anonymization service corresponding to sharing of images or videos capturing identity of persons.

Disclosed is an improved system and process for requesting and providing an anonymization service for sharing images or videos capturing identity of persons, wherein an encrypted or anonymized version of an image or video shared by a first agency with a second agency cannot be fully decrypted or deanonymized by the second agency unless the persons whose identity is captured in the images or videos electronically provide permissions for the second agency to deanonymize or decrypt the respective portions or regions of the images or videos in which identity of the respective persons is captured.

One embodiment provides a method of providing an anonymization service for sharing images or videos capturing identity of persons. The method comprises: receiving, at an anonymization server, a request to provide an anonymization service corresponding to an encrypted version of an image or a video to be shared by a first agency with a second agency, the request including information corresponding to: (i) an identifier uniquely identifying the image or the video, (ii) a particular region within an unencrypted version of the image or the video in which an identity of a person is captured, (iii) an encryption key used by the first agency to encrypt the particular region of the unencrypted version of the image or the video to anonymize the identity of the person in the encrypted version of the image or the video, and (iv) contact information associated with the person; receiving, at the anonymization server, from a computing device associated with a second agency, a request to share an encryption key for decrypting the particular region in the encrypted version of the image or the video shared by the first agency with the second agency, the request including information corresponding to the identifier uniquely identifying the image or the video and the particular region within the image or the video; determining, at the anonymization server, that the identifier included in the request received from the second agency matches with the identifier included in the request received from the first agency, and responsively retrieving contact information associated with the person based on the information included in the request corresponding to the particular region; transmitting, at the anonymization server, based on the contact information associated with the person, a request to the person to provide a permission to deanonymize the identity of the person captured in the image or the video; and transmitting, at the anonymization server, a response including the encryption key to a computing device associated with the second agency when a response indicating a permission is received from the person.

Another embodiment provides an anonymization server, comprising: a communications unit; and an electronic processor communicatively coupled to the communications unit. The electronic processor is configured to: receive, via the communications unit, a request to provide an anonymization service corresponding to an encrypted version of an image or a video to be shared by a first agency with a second agency, the request including information corresponding to: (i) an identifier uniquely identifying the image or the video, (ii) a particular region within an unencrypted version of the image or the video in which an identity of a person is captured, (iii) an encryption key used by the first agency to encrypt the particular region of the unencrypted version of the image or the video to anonymize the identity of the person in the encrypted version of the image or the video, and (iv) contact information associated with the person; receive, at the anonymization server, from a computing device associated with a second agency, a request to share an encryption key for decrypting the particular region in the encrypted version of the image or the video shared by the first agency with the second agency, the request including information corresponding to the identifier uniquely identifying the image or the video and the particular region within the image or the video; determine that the identifier included in the request received from the second agency matches with the identifier included in the request received from the first agency, and responsively retrieve contact information associated with the person based on the information included in the request corresponding to the particular region; transmit, via the communications unit, based on the contact information associated with the person, a request to the person to provide a permission to deanonymize the identity of the person captured in the image or the video; and transmit, via the communications unit, a response including the encryption key to a computing device associated with the second agency when a response indicating a permission is received from the person.

A further embodiment provides a method for requesting an anonymization service for sharing images or videos capturing identity of persons. The method comprises: receiving, at a computing device associated with a first agency, a request to share an image or a video with a second agency; determining, at the computing device, based on analyzing the image or the video via an image or video analytics engine, that a particular region of the image or the video captures an identity of a person; assigning, at the computing device, an encryption key to anonymize the identity of the person; encrypting, at the computing device, the particular region of the image or the video with the encryption key to generate an encrypted version of the image or the video; transmitting, at the computing device, a request to an anonymization server to provide an anonymization service corresponding to the encrypted version of the image or a video, the request including information corresponding to: (i) an identifier uniquely identifying the image or the video, (ii) the particular region of the image or the video in which the identity of the person is captured, (iii) the encryption key used by the computing device to encrypt the particular region of the image or the video to anonymize the identity of the person in the encrypted version of the image or the video, and (iv) contact information associated with the person; receiving, at the computing device, a confirmation from the anonymization server to provide the anonymization service corresponding to the encrypted version of the image or a video; and sharing the encrypted version of the image or the video with the second agency.

Each of the above-mentioned embodiments will be discussed in more detail below, starting with example system and device architectures of the system in which the embodiments may be practiced, followed by an illustration of processing blocks for achieving an improved technical method, device, and system for requesting and providing an anonymization service for sharing images or videos capturing identity of persons. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an anonymization server 110 configured to provide an anonymization service on behalf of agencies 120, 130 corresponding to images or videos shared by one agency (e.g., agency 120) with another agency (e.g., agency 130). Agencies 120, 130 are organizational entities that may store (e.g., in a database 140), retrieve, and/or process various types of data records (e.g., an image 145-1 or a video 145-2, collectively referred to as image or video 145) related to the organization's goals, activities, resources, and the like. In some embodiments, agencies 120, 130 may represent a private enterprise organization such as press, media, utilities, oil/gas, electric, private security, or other business. In other embodiments, agencies 120, 130 may represent a public organization such as a public-safety agency (e.g., police, fire, emergency medical service), governmental entity (e.g., court, city administration), and the like. Each agency 120, 130 respectively employs one or more computing devices 122, 132 that are configured to perform computing functions on behalf of agencies. The computing functions of the computing devices 122, 132 include, but not limited to, receiving, storing, and processing images or videos 145 captured by cameras (not shown) (e.g., surveillance cameras, vehicle cameras, body-worn cameras, mobile device cameras, drone cameras, etc.,) that may be controlled and/or owned by the respective agencies 120, 130. Images or videos 145 captured by cameras that are owned and/or controlled by a particular agency may be referred herein as images or videos 145 owned by the particular agency or associated with the particular agency. For example, as shown in FIG. 1, the agency 120 (also referred to as a "first agency" 120) stores images 145-1 or videos 145-2 captured by the cameras controlled or owned by the agency 120 at a database 140. Similarly, the agency 130 (also referred to as a "second agency" 130) stores images or videos captured by the cameras controlled or owned by the agency 130 at the same database 140 or at a different database. The database 140 may be accessible via a communication network 160. In some embodiments, the database 140 is a commercial cloud-based storage device. In some embodiments, the database 140 is housed on suitable on-premise database servers owned by the respective agencies 120, 130. The database 140 may be maintained by third parties as well.

In some embodiments, the images or videos 145 owned by the agency 120 may represent images or videos that are captured particularly corresponding to an incident. As used herein, the term "incident" may refer to an event, occurrence, or situation that an agency (e.g., agency 120 or agency 130) has been tasked to resolve (e.g., a traffic accident, public disturbance, medical emergency, fire, broken water meter or power line, etc.).

In accordance with embodiments, each image or video 145 owned by an agency (e.g., agency 120) is encrypted to particularly anonymize or hide the identity of one or more persons 150 prior to sharing the image or video 145 with another agency (e.g., agency 130). Briefly referring to FIG. 6, an example image 145-1 captured corresponding to a vehicle collision incident is shown. The image 145-1 may be owned by the agency 120. The image 145-1 further includes a first region 152-1 capturing the identity of a person 150-1 and a second region 152-2 capturing the identity of a person 150-2. As used herein, the term "person" includes any individual from whom the agency (e.g., agency 120) that owns the image has not previously obtained permission for distributing or publishing an image or video revealing the identity of the person. Also, the term "identity" refers to any identifier visually represented in or deduced from such images or videos to uniquely identify or verify an identity of a person. Such visual identifiers may include, but not limited to, face, fingerprint, eye (iris and retina), gesture, gait characteristic, and body marks such as birthmarks, moles, body piercings, tattoos, scars, and the like. Other visual identifiers may exist as well.

Figure 6:
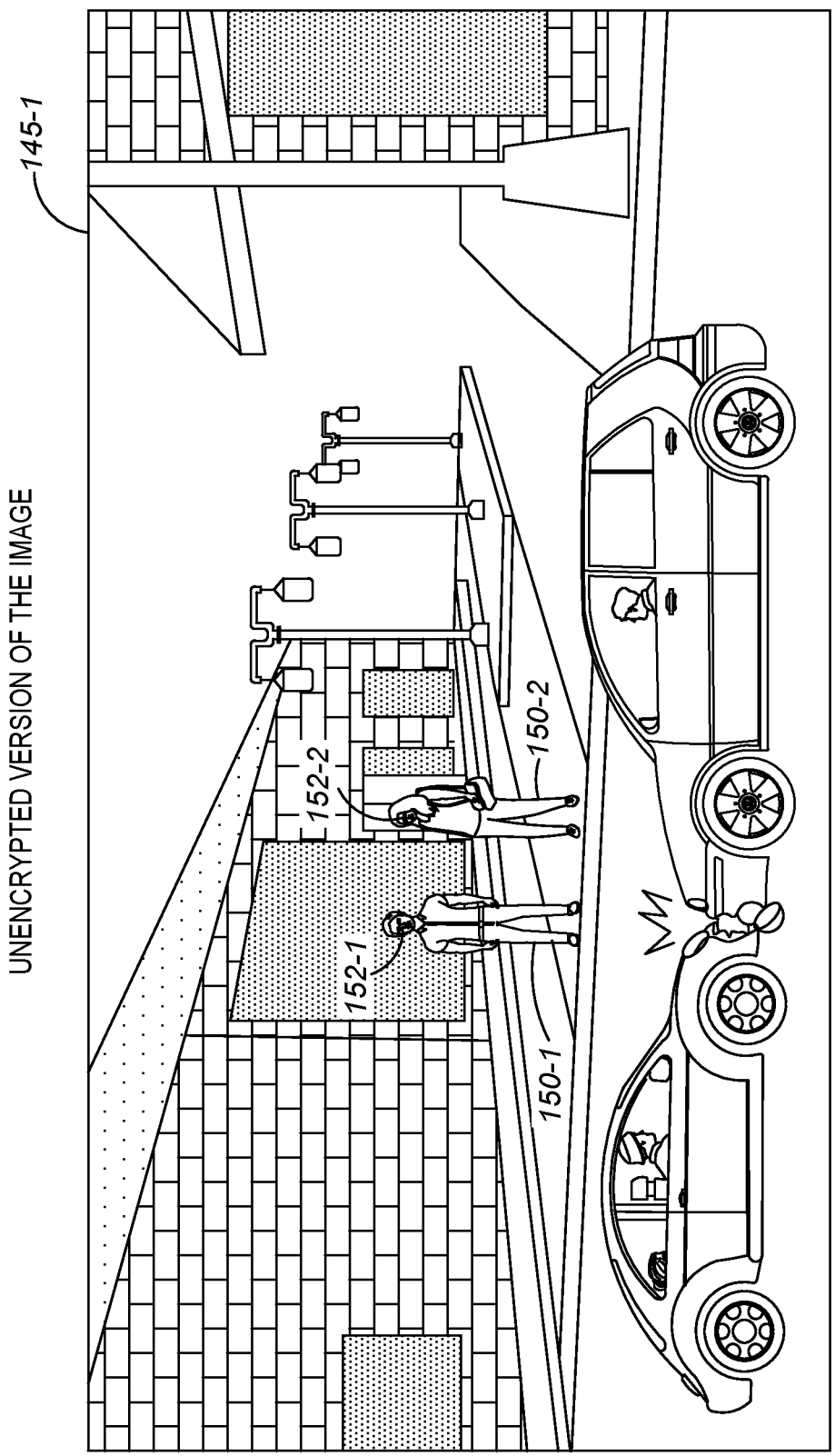
FIG. 6 shows an example of an image to be shared by a first agency with a second agency.

In accordance with some embodiments, an encrypted version of the image or video 145 shared by a first agency 120 cannot be fully decrypted by a second agency 130 unless all the persons 150 whose identities are captured in the image or video 145 provide permissions to the anonymization server 110 to deanonymize or decrypt the regions of the image or video 145 containing the identity of the respective persons. As shown in FIGS. 1 and 6, the persons 150-1, 150-2 captured in the image 145-1 may be contacted by the anonymization server 110 using their respective contact information to obtain permissions for deanonymizing their identities in the image 145-1. Persons 150-1, 150-2 may each be associated with their respective communication devices 155-1, 155-2 to enable them to communicate with the anonymization server 110 and to provide permissions for deanonymizing their respective identities.

In accordance with embodiments, when an agency 120 receives a request (e.g., from a user employed by the agency 120 or agency 130) to share an image or video 145 owned by the agency 120 with another agency 130, the agency 120 first analyzes the image or video 145 to determine whether the image or video 145 has captured an identity of a person 150. If the image or video 145 contains the identity of a person 150, then the agency 120 assigns a unique encryption key (e.g., a symmetric cryptographic key) to anonymize the identity of the person 150 and further encrypts a particular region of the image or video 145 containing the identity (e.g., face) of the person 150 with the encryption key to generate an encrypted version of the image or the video. Agency 120 then requests the anonymization server 110 to provide an anonymization service corresponding to the encrypted version of the image or video 145. When the agency 120 receives a confirmation from the anonymization server 110 to provide the anonymization service, the agency 120 shares the encrypted version of the image or video 145 with the second agency 130. The second agency 130 will not be able to deanonymize (i.e., decrypt) the identity of the person 150 captured in the image or video 145 shared by the first agency 120. So, the second agency 130 may send a request to the anonymization server 110 to share the unique encryption key assigned corresponding to the person 150 for decrypting or deanonymizing the identity of the person 150 captured in the shared image or video 145. The anonymization server 110 in turn retrieves contact information associated with the person 150 and transmits a request to the person 150 to provide a permission to deanonymize the identity of the person 150 captured in the shared image or video 145. When person 150 provides a permission to deanonymize the identity of person 150 in the shared image or video 145, the anonymization server 110 transmits a response including the encryption key to the computing device 132 associated with the second agency 130. The computing device 132 of the second agency 130 then decrypts the identity of the person 150 from the image or video 145 using the encryption key.

In accordance with embodiments, each of the anonymization server 110, computing devices 122, 132 respectively employed by the agencies 120, 130, database 140, and communication devices 155-1, 155-2 are configured to communicate with each other via one or more communication networks 160. The communication network 160 includes wireless and wired connections. For example, the communication network 160 may be implemented using a wide area network, such as the Internet, a local area network, such as a Wi-Fi network, and personal area or near-field networks, for example a Bluetooth™ network. Portions of the communications network 160 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

While only two agencies 120, 130 and one anonymization server 110 are shown as being included in the system 100, the system 100 may include any number of agencies and anonymization servers where different groups of agencies may request a different one of the anonymization server to provide anonymization services corresponding to images or videos shared between agencies in a given group.

Figure 2:
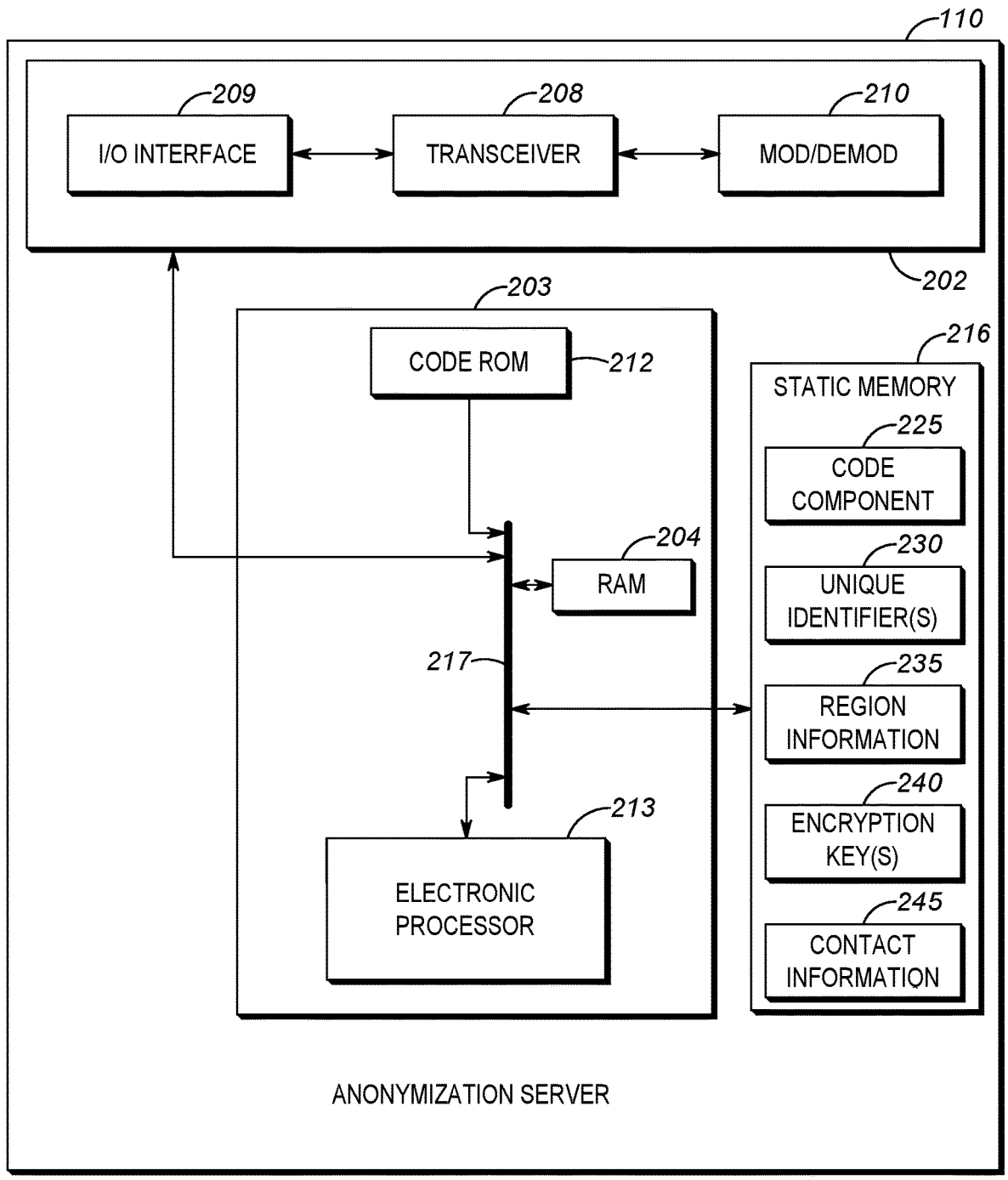
FIG. 2 is a block diagram of an anonymization server shown in FIG. 1 in accordance with some embodiments.

FIG. 2 is an example functional block diagram of an anonymization server 110 operating within the system 100 in accordance with some embodiments. The anonymization server 110 may be embodied in computing devices not illustrated in FIG. 1, and/or may be a distributed computing device across two or more of the foregoing (or multiple of a same type of one of the foregoing) and linked via a wired and/or wireless communication link(s). In one embodiment, one or more functions of the anonymization server 110 may be executed at one or more of the computing devices 122, 132 employed by the agencies 120, 130. While FIG. 2 represents an anonymization server 110 described above with respect to FIG. 1, depending on the type of server, the anonymization server 110 may include fewer or additional components in configurations different from that illustrated in FIG. 2.

As shown in FIG. 2, the anonymization server 110 includes a communications unit 202 (also referred to as "communication interface") coupled to a common data and address bus 217 of a processing unit 203. The communications unit 202 sends and receives data to and from other devices (e.g., computing devices 122, 132, communication devices 155-1, 155-2 etc.,) in the system 100. The communications unit 202 may include one or more wired and/or wireless input/output (I/O) interfaces 209 that are configurable to communicate with other devices in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202, such as for receipt by the computing devices 122, 132 respectively associated with the agencies 120, 130 or the communication devices 155-1, 155-2 respectively associated with the persons 150-1, 150-2.

Figure 4:
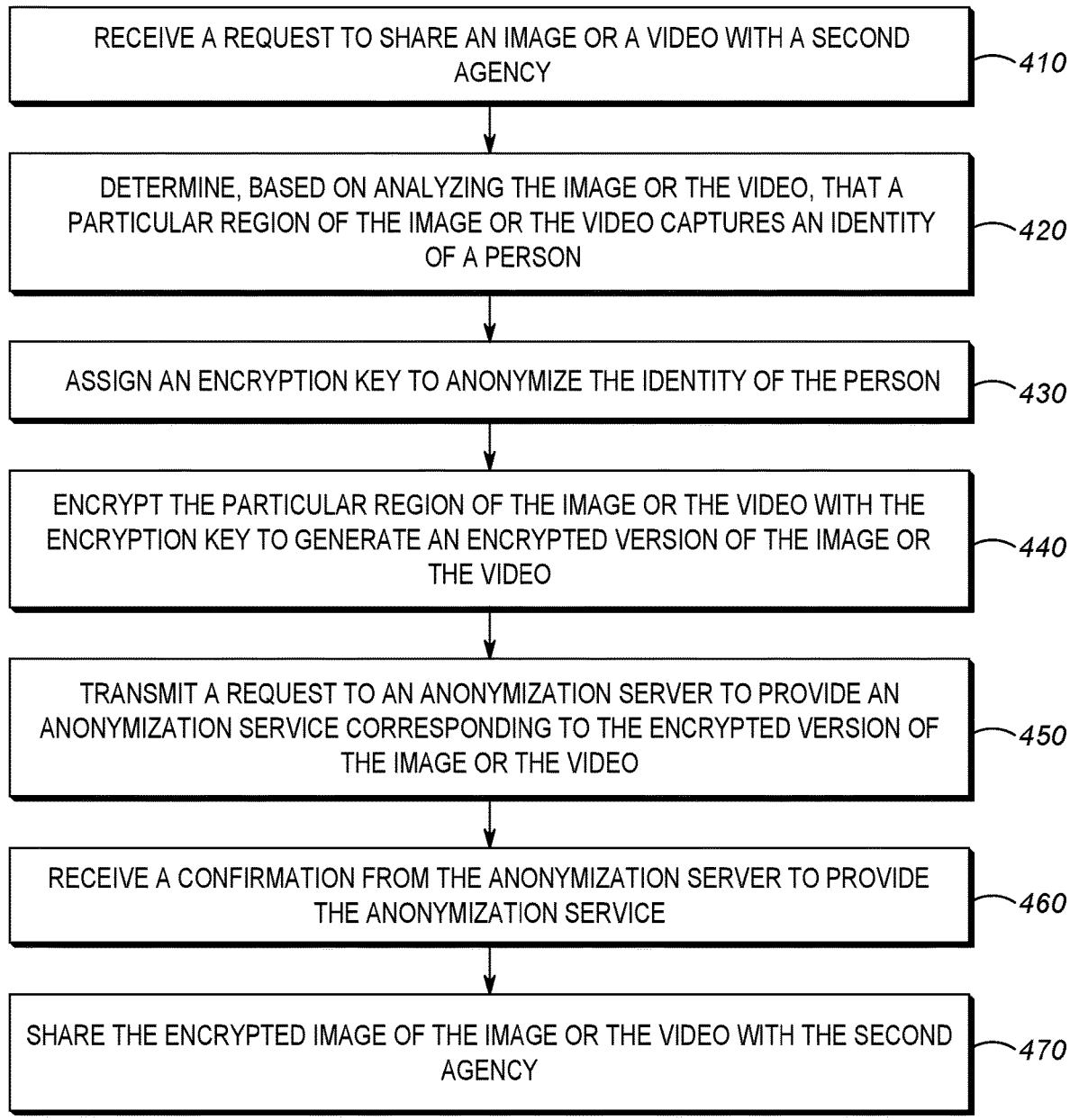
FIG. 4 illustrates a flowchart of a process for requesting an anonymization service for sharing images or videos capturing identity of persons in accordance with some embodiments.

Static memory 216 may store operating code 225 for the electronic processor 213 that, when executed, performs one or more of the blocks set forth in FIGS. 4 and 5 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

The static memory 216 may further store information required for the anonymization server 110 to provide anonymization services on behalf of one or more agencies (e.g., agency 120) corresponding to one or more images or videos (e.g., image or video 145) shared by the agencies with one or more other agencies (e.g., agency 130). For example, as shown in FIG. 2, the static memory 216 stores unique identifier(s) 230, region information 235, encryption key(s) 240, and contact information 245. In accordance with some embodiments, the anonymization server 110 receives a request from the first agency 120 to provide an anonymization service corresponding to an encrypted version of an image 145-1 or a video 145-2 (collectively referred to as image or video 145) to be shared by the first agency 120 with the second agency 130. The request includes information corresponding to one or more of the unique identifier(s) 230, region information 235, encryption key(s) 240, and contact information 245. The unique identifier 230 includes an identifier that uniquely identifies a particular image or video 145 corresponding to which the anonymization service is requested. The region information 235 identifies a particular region within an unencrypted version of the image or video 145 in which an identity of a person is captured or revealed. As an example, the region information of an image (e.g., image 145-1) may indicate pixel coordinates (e.g., a pair of integers including a row number and a column number) of an image in which the identity (e.g., face) of a person 150 is captured. In the case of a video (e.g., video 145-2), the region information additionally includes one or more of: frame numbers, time frames, or specific images or image sequences in which the identity of a person 150 appears during playback of the video 145-2. The encryption key 240 represents a unique encryption key (e.g., a symmetric cryptographic key) used by the first agency 120 to encrypt a particular region (e.g., region 152-1 or region 152-2 of the image 145-1 shown in FIG. 6) of the unencrypted version of the image or video 145 to anonymize the identity of the person 150 in the encryption version of the image or video 145. The contact information 245 includes contact address (e.g., phone number, email address, etc.,) of the person 150 whose identity is captured in the unencrypted version of the image or video 145 to be shared by the first agency 120 with the second agency 130. In accordance with embodiments, the anonymization server 110 maintains information corresponding to the unique identifier(s) 230, region information 235, encryption key(s) 240, and contact information 245 received from the first agency 120 for providing an anonymization service corresponding to an image or video 145 to be shared by the first agency 120 with the second agency 130.

Figure 3:
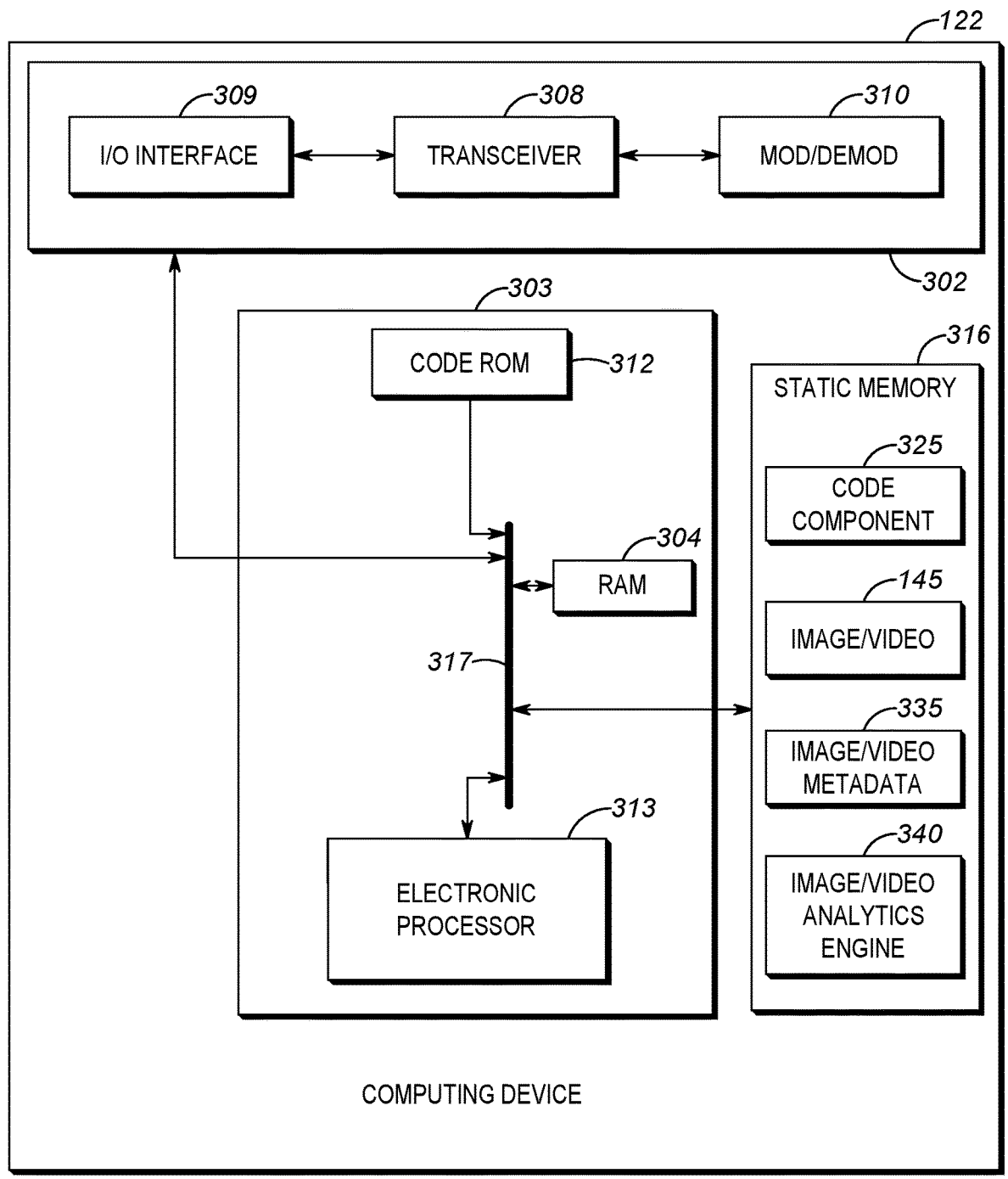
FIG. 3 is a block diagram of a computing device shown in FIG. 1 in accordance with some embodiments.

FIG. 3 is an example functional block diagram of a computing device operating within the system 100 in accordance with some embodiments. The components of the computing device shown in FIG. 3 may be embodied in computing devices (e.g., computing device 122) employed by the agencies (e.g., agency 120) illustrated in FIG. 1. The computing device 122 may be a distributed computing device across two or more of the foregoing (or multiple of a same type of one of the foregoing) and linked via a wired and/or wireless communication link(s). While FIG. 3 represents a computing device 122 employed by the agency 120 described above with respect to FIG. 1, depending on the type of computing device, the computing device 122 may include fewer or additional components in configurations different from that illustrated in FIG. 2. The computing device 132 employed by the second agency 130 may include same or similar components shown in FIG. 3.

As shown in FIG. 3, the computing device 122 includes a communications unit 302 coupled to a common data and address bus 317 of a processing unit 303. The communications unit 302 sends and receives data to and from other devices (e.g., anonymization server 110, computing device 132, and database 140) in the system 100. The communications unit 202 may include one or more wired and/or wireless input/output (I/O) interfaces 309 that are configurable to communicate with other devices in the system 100. For example, the communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The processing unit 303 may include an encoder/decoder with a code Read Only Memory (ROM) 312 coupled to the common data and address bus 317 for storing data for initializing system components. The processing unit 303 may further include an electronic processor 313 (for example, a microprocessor, a logic circuit, an application-specific integrated circuit, a field-programmable gate array, or another electronic device) coupled, by the common data and address bus 317, to a Random Access Memory (RAM) 304 and a static memory 316. The electronic processor 313 may generate electrical signals and may communicate signals through the communications unit 310, such as for receipt by the anonymization server 110 or other computing devices, for example, computing device 132 employed by the second agency 130.

Static memory 316 may store operating code 325 for the electronic processor 313 that, when executed, performs one or more of the blocks set forth in FIGS. 4 and 5 and the accompanying text(s). The static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

The static memory 316 may further store information required for the computing device 122 to request anonymization services on behalf of the agency 120 corresponding to one or more images or videos (e.g., image or video 145) owned by the agency 120 and to be shared by the agency 120 with another agency such as the second agency 130. For example, as shown in FIG. 3, the computing device 122 may store images or videos 145 either locally at the static memory or at a database 140 that is accessible via the communication network 160. In some embodiments, the computing agency 120 may locally store identifiers at the static memory 316, where the identifiers uniquely identify the respective images or videos that may be stored in a remote database 140. The static memory 316 further stores image or video metadata 335 and image or video analytics engine 340. In accordance with embodiments, the computing device 122 analyzes the image or video 145 to be shared with another agency 130 to determine whether one or more regions of the image or video 145 captures an identity of a person 150. For example, the image or video analytics engine 340 may include one or more object classifiers that may be particularly trained to identify an instance of a person 150 or more particularly to identify any region within the image or video 145 that reveals one or more biometric attributes (e.g., face characteristic) that can be used to identify a particular person's identity. The information obtained based on the analysis of the image or video 145 via the image/video analytics engine 340 is stored as image or video metadata 335. The image or video metadata 335 may include information corresponding to one or more of: (i) an identifier uniquely identifying the image or video 145, (ii) a particular region (e.g., identified by pixel coordinates) of the image or video 145 in which the identity of the person 150 is captured, (iii) an encryption key used by the computing device 122 to encrypt the particular region of the image or video 145 to anonymize the identity of the person 150 in the encrypted version of the image or video 145, and (iv) contact information associated with the person 150. In some embodiments, the computing device 122 may locally store the encrypted version of the image or video 145 at the static memory. In these embodiments, when a request to share the image or video 145 with a second agency 130 is received, the computing device 122 employed by the first agency 120 shares the encrypted version of the image or video 145 with the second agency 130 after authenticating the second agency 130. In other embodiments, an encrypted version of the image or video 145 may be stored at the database 140. In these embodiments, when a request to share the image or video 145 with a second agency 130 is received, the computing device 122 employed by the first agency 120 authenticates the second agency 130 and then shares a resource address (e.g., uniform resource locator) of a resource (e.g., database 140) in which the encrypted version of the image or video 145 is stored. In this case, the second agency 130 accesses the encrypted version of the image or video 145 from the resource using the resource address shared by the first agency 120.

Turning now to FIG. 4, a flowchart diagram illustrates a process 400 of requesting an anonymization service for sharing images or videos capturing identity of persons. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. A computing device 122 shown in FIG. 1 and/or FIG. 3, and embodied as a singular computing device or distributed computing device may execute process 400 via an electronic processor 313. In accordance with embodiments, the process 400 is particularly executed by a computing device 122 employed by or associated with an agency 120 that is requesting an anonymization service from an anonymization server 110 for sharing images or videos with another agency 130.

The computing device 122 may execute the process 400 at power-on, at some predetermined periodic time period thereafter, in response to a trigger raised locally at the computing device 122 via an internal process or via an input interface or in response to a trigger from an external device to which the computing device 122 is communicably coupled, among other possibilities. As an example, the computing device 122 is programmed to automatically trigger execution of the process 400 when a request to share an image or video (e.g., image 145-1 owned by the agency 120 employing the computing device 122) with another agency 130 is received.

The process 400 of FIG. 4 need not be performed in the exact sequence as shown and likewise various blocks may be performed in different order or alternatively in parallel rather than in sequence. As an example, the determination step shown in block 420 of FIG. 4 may be executed prior to the receiving step shown in block 410 of FIG. 4. The process 400 may be implemented on variations of the system 100 of FIG. 1 as well.

Figure 7:
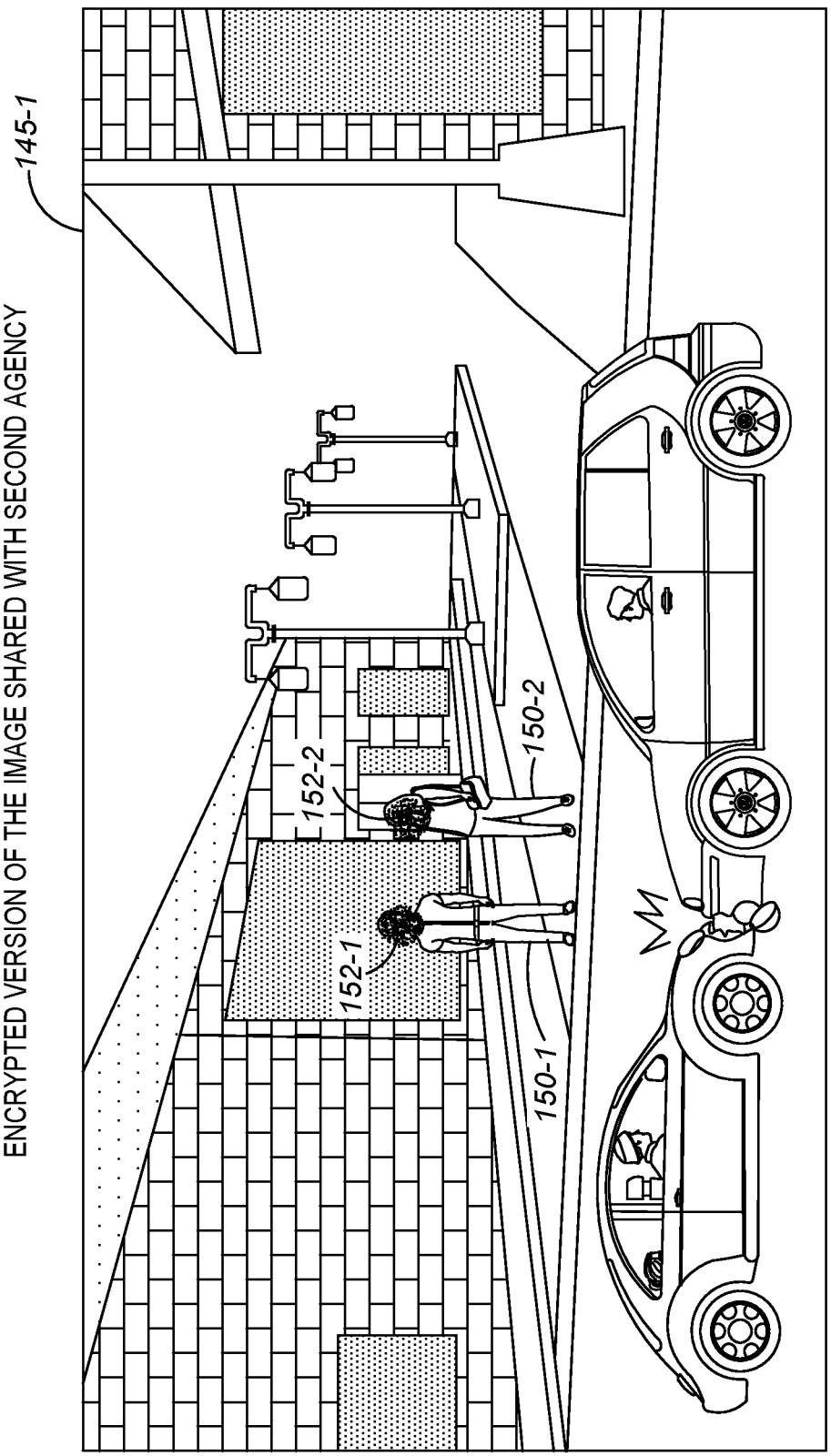
FIG. 7 shows an example of an encrypted or anonymized version of an image shared by a first agency with a second agency.

The process 400 will be described below with reference to the example images shown in FIGS. 6 and 7. FIG. 6 shows an unencrypted version of an image 145-1 that is captured corresponding to a vehicle collision incident. FIG. 7 shows an encrypted version of the image 145-1 in which identities of persons 150-1, 150-2 captured in the image 145-1 are anonymized prior to sharing the image 145-1 with another agency 130.

At block 410, the computing device 122 associated with a first agency 120 receives a request to share an image (e.g., image 145-1) or a video (e.g., video 145-2) with a second agency 130. In accordance with some embodiments, the request may be received from a user associated with the second agency 130. For example, the image 145-1 corresponding to a vehicle collision incident may be captured by one or more surveillance cameras owned by the first agency 120 such as a city municipal government. Suppose the second agency 130 is an investigative department of an insurance company that needs access to the image 145-1 owned by the first agency 120. An officer associated with the second agency 130 i.e., insurance company may send a request to the agency 120 i.e., city municipal government to share an image 145-1 corresponding to the vehicle collision accident. In some embodiments, the request to share an image or video 145 with a second agency 130 may be received from a user associated with a first agency 120. For example, the image 145-1 corresponding to a vehicle collision incident may be captured by one or more surveillance cameras owned by the first agency 120 such as a city municipal government. Suppose an authorized officer of the first agency 120 i.e. the city municipal government decides to share the image 145-1 with a second agency 130 which is a press or news agency. The authorized officer of the first agency 120 may send a request to the computing device 122 associated with the first agency 120 to share an image or video 145 with a second agency 130.

The request to share the image or video 145 may include one or more of: agency information (e.g., name of agency, location of agency, agency credential etc.,) identifying the second agency 130 to which the image or video 145 is to be shared, information about the requester (e.g., name of user, agency to which the user is affiliated with, user credential), an identifier (e.g., a computer aided dispatch identifier) identifying the incident, location of the incident, type of incident, location of the incident, purpose of requesting the image or video 145, and other specific information identifying the incident such as license plate numbers of vehicles involved in the collision incident. Additionally or alternatively, the request may also include a specific identifier that uniquely identifies the image or video 145 to be shared with the second agency 130. In any case, the computing device 122 receives the request and identifies one or more images or videos (e.g., image 145-1 corresponding to the vehicle collision incident) that need to be shared with the second agency 130.

At block 420, the computing device 122 associated with the first agency 120 analyzes the image or video 145 to be shared with the second agency 130 using an image/video analytics engine 340. Based on the analysis of the image or video 145, the computing device 122 determines that a particular region of the image or video 145 captures an identity of a person 150. In accordance with some embodiments, the computing device 122 may determine multiple regions (e.g., identified by pixel coordinates and/or frame numbers) within the image or video 145, where each region may capture an identity of a different person. As illustrated by the example image 145-1 shown in FIG. 6, the image 145-1 includes a first region 152-1 revealing the identity (i.e., face) of a first person 150-1 and a second region 152-2 revealing the identity (i.e., face) of a second person 150-2.

In accordance with some embodiments, the computing device 122 further retrieves contact information of the person 150 whose identity is captured in the particular region of the image or video 145. In the example shown in FIG. 6, the computing device 122 retrieves contact information of person 150-1 as well as contact information of person 150-2. The computing device 122 may compare the identity (e.g., a unique face characteristic) of the persons 150-1, 150-2 extracted from the image 145-1 with a list of identities included in a pre-stored identity database (e.g., database 140) accessible by the computing device 122. If the identity of the persons 150-1, 150-2 match with one or more of the identities included in the pre-stored identity database, the computing device 122 retrieves contact information (e.g., email address, phone number, social media ID etc.,) that is mapped corresponding to the matching identity from the pre-stored identity database. If there is no match between the identity of the persons 150-1, 150-2 and the identities included in the pre-stored identity database, the computing device 122 may prompt an authorized user from the first agency 120 to obtain contact information of the persons 150-1, 150-2 in accordance with contact information acquisition policy of the agency 120. In this case, the computing device 122 may further tag the image 145-1 with metadata indicating that contact information is unavailable for one or more persons 150 whose identities are captured in the image 145-1

At block 430, the computing device 122 associated with the first agency 120 assigns an encryption key such as a symmetric cryptographic key to anonymize the identity of the person 150 captured in the image or video 145. In accordance with embodiments, the computing device 122 may assign different encryption keys for different persons 150 captured in the image or video 145. In the example shown in FIG. 6, the computing device 122 assigns a first encryption key to anonymize the identity of the first person 150-1 and a second encryption key to anonymize the identity of the second person 150-2.

At block 440, the computing device 122 associated with the first agency 120 encrypts the particular region (i.e., a region within the image or video 145 that reveals the identity of the person 150) of the image or video 145 with the encryption key to generate an encrypted version of the image or video 145. In accordance with some embodiments, the encrypted version of the image or video 145 includes one or more regions (capturing the identity of persons 150) that are respectively encrypted using the respectively assigned encryption keys and remaining regions (which do not include identity of persons) that are not encrypted. Briefly referring to FIG. 7, an encrypted version of the image 145-1 is shown. In the encrypted version of the image 145-1 shown in FIG. 7, the first region 152-1 corresponding to the person 150-1 is anonymized or encrypted with the first encryption key to ensure that a user associated with the second agency 130 will not be able to view or distribute the image 145-1 while revealing the identity of the person 150-1 without possessing the first encryption key. For example, as a result of encryption, the first region 152-1 corresponding to the person 150-1 may be obfuscated, masked, or blurred (as shown in FIG. 7) such that the identity of the person 150-1 will not be recognizable to anyone viewing the encrypted version of the image 145-1. Similarly, the second region 152-2 corresponding to the person 150-2 is anonymized or encrypted with the second encryption key to ensure that a user associated with the second agency 130 will not be able to view or distribute the image 145-1 while revealing the identity of the person 150-2 without possessing the second encryption key. For example, as a result of encryption, the second region 152-2 corresponding to the person 150-2 may be obfuscated, masked, or blurred (as shown in FIG. 7) such that the identity of the person 150-2 will not be recognizable to anyone viewing the encrypted version of the image 145-1.

At block 450, the computing device 122 transmits a request to an anonymization server 110 shown in FIGS. 1 and 2 to provide an anonymization service (which is further described with reference to FIG. 5) corresponding to the encrypted version of the image or video 145 generated at block 440. The request to the anonymization server 110 includes information corresponding to (i) an identifier uniquely identifying the image or video 145 corresponding to which anonymization service is being requested from the anonymization server 110, (ii) the particular region (e.g., region 152-1 of the image 145-1 shown in FIG. 6) of the image or video 145 in which the identity of a person 150 (e.g., person 150-1 shown in FIG. 7) is captured, (iii) the encryption key used by the computing device 122 at block 430 to encrypt the particular region of the image or video 145 to anonymize the identity of the person 150 in the encrypted version of the image or video 145 (e.g., image 145-1 shown in FIG. 7), and (iv) contact information associated with the person 150. In one embodiment, the computing device 122 additionally includes a copy of the encrypted version of the image or video 145 in the request transmitted to the anonymization server 110. In case identities of multiple persons 150-1, 150-2 are to be anonymized as shown in the encrypted version of the image 145-1 shown in FIG. 7, the request to the anonymization server 110 to provide the anonymization service includes information corresponding to each of the multiple persons 150-1, 150-2 captured in the image 145-1. For example, the request additionally includes information corresponding to: (i) a particular second region (e.g., region 152-2 of the image 145-1 shown in FIG. 6) of the image or video 145 in which the identity of the second person (e.g., person 150-2 shown in FIG. 6) is captured, (ii) the second encryption key used by the computing device 122 to encrypt the particular second region of the image or video 145 to anonymize the identity of the second person in the encrypted version of the image or video 145, and (iv) contact information associated with the second person. In case an encrypted version of an image or video 145 is generated based on multiple encryption keys each assigned corresponding to different persons, the encrypted version of the image or video 145 includes a first region (e.g., region 152-1 of the image 145-1 shown in FIG. 7) encrypted using a first encryption key assigned corresponding to a first person 150-1 whose identity is captured in the first region (i.e., in the unencrypted version of the image or video 145) and further a second region (e.g., region 152-2 of the image 145-1 shown in FIG. 7) encrypted using a second encryption key assigned corresponding to a second person 150-2 whose identity is captured in the second region (i.e., in the unencrypted version of the image or video 145). In addition, the encrypted version of the image or video 145 may include other regions that are not encrypted (see FIG. 7) when the other regions do not capture an identity of a person in the unencrypted version of the image or video 145.

At block 460, the computing device 122 associated with the first agency 120 receives a confirmation from the anonymization server 110 to confirm that the anonymization server 110 will be providing the anonymization service corresponding to the encrypted version of the image or video 145. The confirmation from the anonymization server 110 may include the identifier of the image or video 145 corresponding to which anonymization service will be provided by the anonymization server 110.

At block 470, the computing device 122 shares the encrypted version of the image or video 145 with the second agency 130. In one embodiment, the computing device 122 shares the encrypted version of the image or video 145 with the second agency 130 only after verifying that a confirmation is received from the anonymization server 110 to provide the anonymization service corresponding to the encrypted version of the image or video 145 to be shared with the second agency 130. In other embodiments, the computing device 122 may first share the encrypted version of the image or video 145 with the second agency 130 prior to requesting the anonymization server 110 to provide an anonymization service corresponding to the encrypted version of the image or video 145.

In accordance with some embodiments, the computing device 122 may re-encrypt the encrypted version of the image or video 145 to be shared with the second agency using a symmetric encryption key previously shared with the second agency 130 or a public asymmetric key of the second agency 130. In this case, the second agency 130 is able to retrieve the encrypted version of the image or video 145 using the symmetric encryption key or a private key, but the second agency 130 would still need an encryption key (i.e., encryption key assigned at block 430) corresponding to a person 150 to decrypt or deanonymize a particular region in which the identity of the person 150 is captured.

Turning now to FIG. 5, a flowchart diagram illustrates a process 500 for providing an anonymization service for sharing images or videos capturing identity of persons. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. An anonymization server 110 shown in FIG. 1 and/or FIG. 2, and embodied as a singular server or distributed server may execute process 500 via an electronic processor 213. The anonymization server 110 may execute the process 500 at power-on, at some predetermined periodic time period thereafter, in response to a trigger raised locally at the anonymization server 110 via an internal process or via an input interface or in response to a trigger from an external device to which the 110 is communicably coupled, among other possibilities. As an example, the computing device 122 is programmed to automatically trigger execution of the process 500 when a request to provide an anonymization service is received from an agency 120, 130.

The process 500 of FIG. 5 need not be performed in the exact sequence as shown and likewise various blocks may be performed in different order or alternatively in parallel rather than in sequence.

Figure 8:
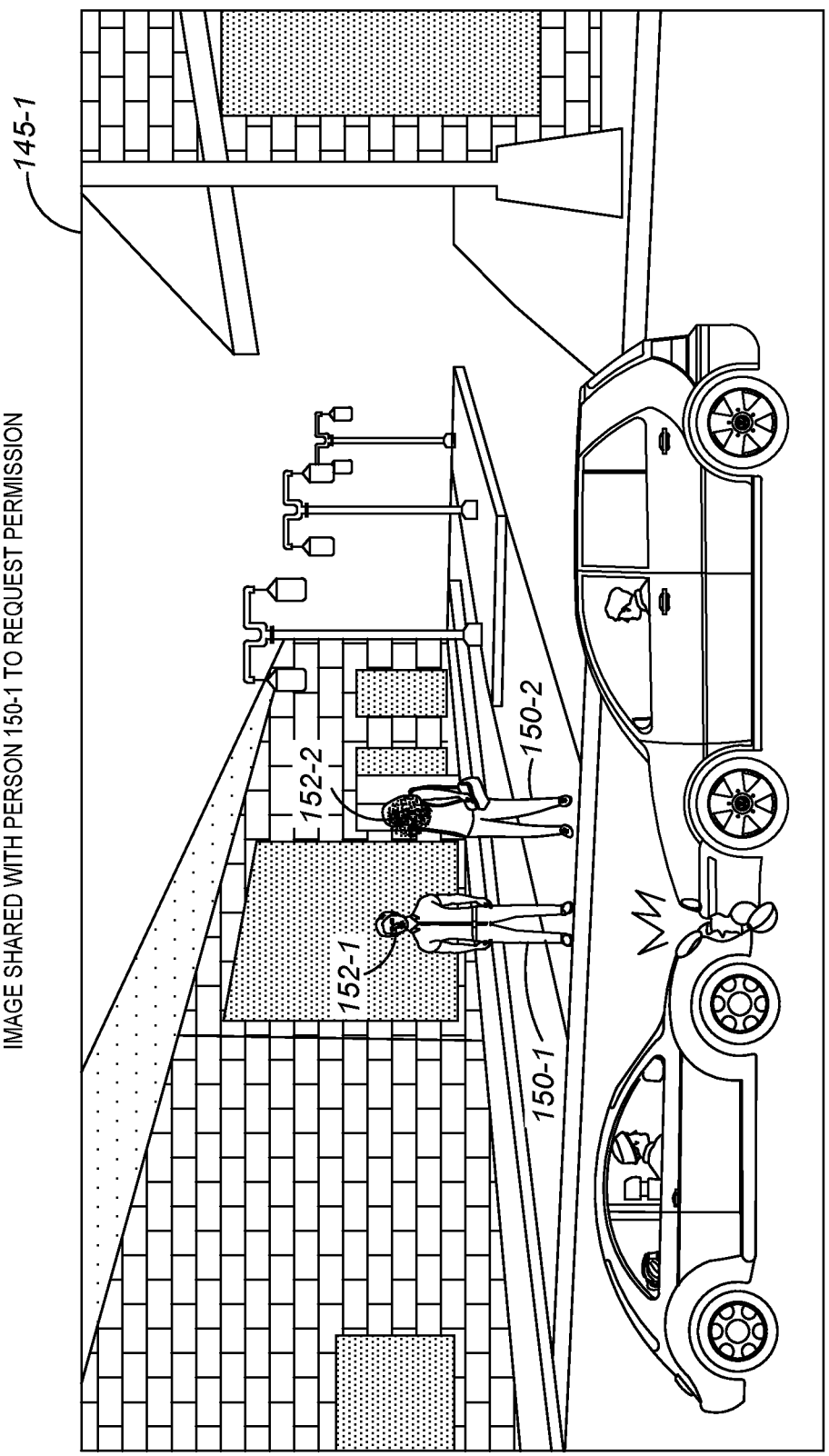
FIG. 8 shows an example of an encrypted version of an image shared with a first person for the purpose of obtaining permission to deanonymize the identity of the first person captured in the image.
Figure 9:
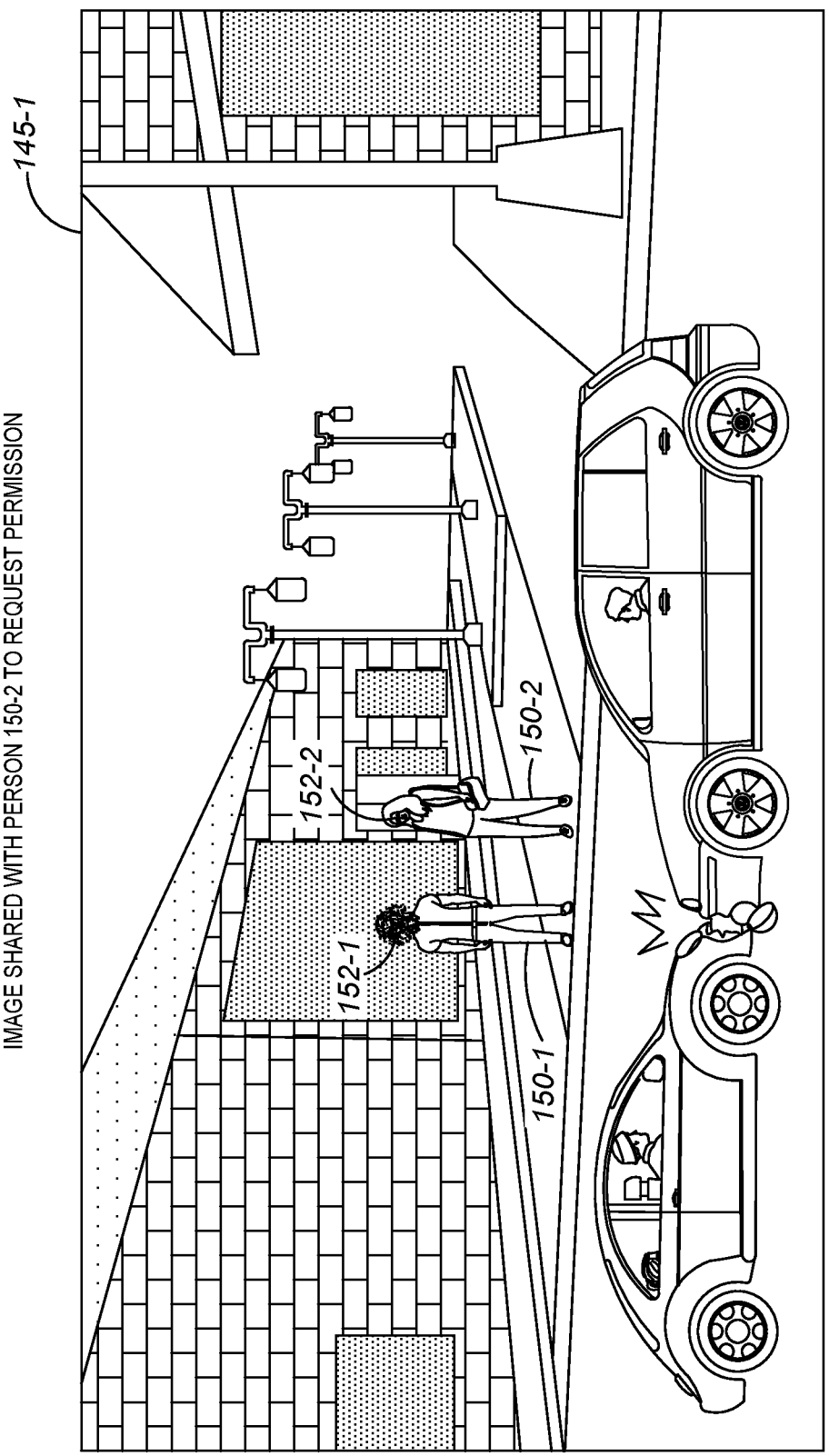
FIG. 9 shows an example of an encrypted version of an image shared with a second person for the purpose of obtaining permission to deanonymize the identity of the second person captured in the image.

The process 500 will be described below with reference to the example images shown in FIGS. 6, 7, 8, and 9. FIG. 6 shows an unencrypted version of an image 145-1 that is captured corresponding to a vehicle collision incident. FIG. 7 shows an encrypted version of the image 145-1 in which identities of persons 150-1, 150-2 captured in the image 145-1 are anonymized prior to sharing the image 145-1 with another agency 130. FIG. 8 shows another encrypted version of the image 145-1 in which identity of person 150-2 is anonymized while the identity of person 150-1 is deanonymized (i.e., identity is revealed). FIG. 9 shows yet another encrypted version of the image 145-1 in which identity of person 150-1 is anonymized while the identity of person 150-2 is deanonymized.

At block 510, the anonymization server 110 receives a request to provide an anonymization service corresponding to an encrypted version of an image or video 145 to be shared by a first agency 120 with a second agency 130. The request may be received from a computing device 122 associated with the first agency 120 via the communication network 160 shown in FIG. 1. The request includes information corresponding to: (i) an identifier uniquely identifying the image or video 145 (e.g., image 145-1 shown in FIG. 6), (ii) a particular region (e.g., region 152-1 within the image 145-1 shown in FIG. 6) within an unencrypted version of the image or video 145 in which an identity of a person (e.g., person 150-1 shown in FIG. 6) is captured, (iii) an encryption key used by the first agency 120 to encrypt the particular region of the unencrypted version of the image or video 145 to anonymize the identity of the person 150 in the encrypted version of the image or video 145 (e.g., encrypted version of image 145-1 shown in FIG. 7), and (iv) contact information associated with the person 150.

In some embodiments, the request may additionally include a copy of the encrypted version of the image or video 145 (e.g., encrypted version of the image 145-1 shown in FIG. 7) generated by the computing device 122 associated with the first agency 120. The request may further include one or more of: agency information (e.g., name of agency, location of agency, agency credential etc.,) identifying the first agency 120 requesting the anonymization server 110, agency information (e.g., name of agency, location of agency etc.,) identifying the second agency 130 to which the image or video 145 is to be shared, information about the user requesting the anonymization service (e.g., name of user, agency to which the user is affiliated with, user credential etc.,), an identifier (e.g., a computer aided dispatch identifier) identifying an incident corresponding to which the image or video 145 is captured, location of the incident, type of incident, location of the incident, and purpose of sharing the image or video 145 with the second agency.

In accordance with some embodiments, the anonymization server 110 processes the request received from the computing device 122 associated with the first agency 120 and determines whether the agency 120 or the user associated with the agency 120 requesting the anonymization service is authorized or subscribed to receive the anonymization service from the anonymization server 110. For example, the anonymization server 110 verifies the credentials of the agency 120 or the user associated with the agency 120 to determine whether the agency 120 or the user associated with the agency 120 requesting the anonymization service is authorized or subscribed to receive the anonymization service from the anonymization server 110. If the agency 120 or the user associated with the agency 120 is authorized to receive the anonymization service, the anonymization server 110 transmits a response via the communication network 160. The response provides confirmation that the anonymization server 110 will provide the anonymization service corresponding to the encrypted version of the image or video 145 indicated in the request received from the agency 120. The anonymization server 110 further stores (e.g., at static memory 216) the information included in the request received from the first agency 120 to provide anonymization service on behalf of the first agency 120.

At block 520, the anonymization server 110 receives a request to share an encryption key for decrypting the particular region in the encrypted version of the image or video 145 shared by the first agency 120 with the second agency 130. The request may be received from a computing device 132 associated with the second agency 130 via the communication network 160 shown in FIG. 1. The request includes information corresponding to: (i) an identifier uniquely identifying the encrypted version of the image or video 145 (e.g., image 145-1 shown in FIG. 7) shared with the second agency 130 and (ii) a particular region (e.g., region 152-1 within the image 145-1 shown in FIG. 7) within the encrypted version of the image or video 145 in which an identity of a particular person (e.g., person 150-1 who is anonymized in the image 145-1 shown in FIG. 7) is anonymized. In other words, the request from the second agency 130 uniquely identifies a particular image or video 145 which has been shared with the second agency 130 and also one or more regions (e.g., identified by pixel coordinates) within the image or video 145 to be deanonymized or decrypted. In some embodiments, the request may also include information corresponding to a particular second region (e.g., region 152-2 within the image 145-1 shown in FIG. 7) within the encrypted version of the image or video 145 in which an identity of a particular second person (e.g., person 150-2 who is anonymized in the image 145-1 shown in FIG. 7) is anonymized. In accordance with some embodiments, the request received from the computing device 132 associated with the second agency 130 may include agency information (e.g., name of agency, location of agency, agency credential etc.,) identifying the second agency 130 which is requesting the encryption key for decrypting a particular region in the encrypted version of the image or video 145 shared by the first agency 120. In accordance with some embodiments, in response to receiving the request from the computing device 132 associated with the second agency 130, the anonymization server 110 authenticates the credentials of the second agency 130 based on the agency information before contacting a person (e.g., person 150-1) to obtain permission to deanonymize the identity of the person captured in the image or video 145.

At block 530, the anonymization server 110 compares the identifier included in the request received at block 520 from the computing device 132 associated with the second agency 130 with a list of identifiers (e.g., unique identifiers 230 stored at the static memory 216) identifying a set of images or videos corresponding to which the anonymization server 110 has confirmed to provide anonymization services on behalf of the respectives agencies (e.g., agency 120) requesting (e.g., request received at block 510) the services. When the anonymization server 110 determines that the identifier included in the request received from the computing device 132 associated with the second agency 130 matches with an identifier included in the list of identifiers, the anonymization server 110 retrieves contact information associated with a particular person based on the information included in the request corresponding to the particular region. For example, the anonymization server 110 may determine that the identifier included in the request received at block 520 matches with an identifier of an image 145-1 shown in FIG. 7. In this example, the anonymization server 110 may further determine that contact information corresponding to person 150-1 needs to be retrieved when the region information includes, for example, pixel coordinates corresponding to region 152-1 within the image 145-1 shown in FIG. 7. If the request received at block 520 additionally identifies a second region (e.g., pixel coordinates corresponding to region 152-2) within the image 145-1, then the anonymization server 110 further retrieves contact information of the second person 150-2 because the region 152-2 anonymizes the identity of the second person 150-2 in the encrypted version of the image 145-1 shown in FIG. 7.

At block 540, based on the contact information retrieved at block 530, the anonymization server 110 transmits a request to the person 150 (e.g., person 150-1 captured within the image 145-1 shown in FIG. 7) to provide a permission to deanonymize the identity of the person 150. In accordance with some embodiments, the request is submitted in electronic form and may be transmitted to an email address or phone number of the person 150 from the anonymization server 110 via the communication network 160. For example, the person 150-1 may access the request received from the anonymization server 110 via a communication device 155-1 operated by the person 150-1. In one embodiment, the request received (at block 520) from the computing device 132 associated with the second agency 130 further includes information corresponding to a media platform (e.g., social media profile address, web portal address, news channel etc.,) associated with the second agency 130 in which the image or video 145 capturing the identity of the person 150 will be published. In this case, prior to transmitting the request to the person 150 at block 540, the anonymization server 110 includes in the request, information corresponding to the media platform associated with the second agency 130 in which the image or video 145 capturing the identity of the person 150 will be published. In another embodiment, the request received by the anonymization server 110 at block 520 from the computing device 132 associated with the second agency includes a text description indicating a specific purpose for which the second agency 130 is requesting to deanonymize the person's identity or to decrypt the particular region of the encrypted version of the image or video 145. In this case, prior to transmitting the request to the person at block 540, the anonymization server 110 includes in the request, the text description indicating the specific purpose for which the second agency 130 is requesting to decrypt the particular region of the encrypted version of the image or video 145. For example, the second agency 130 may indicate that the specific purpose for requesting to deanonymize or decrypt the person's identity is to view the identity of the person 150-1 for investigation purpose, but not to further distribute or publicly share the image 145-1 shown in FIGS. 6 and 7.

Including information about the media platform or specific purpose for decrypting the person's identity in the request transmitted to the person 150 allows the person 150 to decide whether or not the person 150 wants his/her identity (e.g., face) to be published in a particular media platform. For example, when the person 150-1 receives a request including information about the media platform on which the image 145-1 revealing the identity of the person will be published, the person 150-1 may not want his/her face to be published on the media platform. Also, the person 150-1 may not want his/her face to be associated with a particular incident when the image is published on the media platform. In this case, the person 150-1 may choose to ignore the received request or alternatively input a response (via the communication device 155-1) declining permission to the anonymization server 110 to deanonymize the person's identity or to share the encryption key to the computing device 132 associated with the second agency 130. Alternatively, based on the information included in the request about the media platform on which the image 145-1 will be published or the text description of the specific purpose for which the person's identity will be anonymized or decrypted, the person 150-1 may decide to provide permission to the anonymization server 110. In this case, the person 150-1 may input a response (via the communication device 155-1) indicating a permission to deanonymize the identity of the person 150-1 captured in the image 145-1. The response indicating a permission from the person 150-1 may be transmitted from the communication device 155-1 to the anonymization server 110 via the communication network 160.

In accordance with some embodiments, the request transmitted to the person 150 at block 540 may include a second encrypted version of the image or video 145 in which the identity of the person 150 is not anonymized by not encrypting the particular region in the image or video 145 capturing the identity of the person 150, but the identity of any person other than the person 150 (to whom the request is transmitted at block 540) is anonymized by encrypting another region in the image or video 145 capturing the identity of any person other than the person (to whom the request is transmitted at block 540) using a different encryption key. For example, assume that, at block 540, the anonymization server 110 requests a person 150-1 (based on contact information retrieved at block 530) to provide a permission for deanonymizing the identity of person 150-1. In this case, the request may further include a second encrypted version of the image 145-1 as shown in FIG. 8. In the second encrypted version of the image 145-1, the region 152-1 within the image 145-1 capturing the identity of the person 150-1 remains unencrypted to allow the person 150-1 to view his/her own identity and to decide whether the person 150-1 wants his/her identity to be decrypted by the second agency 130 for the specific purpose indicated by the second agency 130. Further, in the second encrypted version of the image 145-1 shown in FIG. 8, the region 152-2 within the image 145-1 capturing the identity of the person 150-2 is encrypted to prevent the identity of the person 150-2 from being revealed to the person 150-1. Similarly, in another example, assume that, at block 540, the anonymization server 110 requests a person 150-2 (based on contact information retrieved at block 530) to provide a permission for deanonymizing the identity of person 150-2. In this case, the request may further include a third encrypted version of the image 145-1 as shown in FIG. 9. In the third encrypted version of the image 145-1 shown in FIG. 9, the region 152-2 within the image 145-1 capturing the identity of the person 150-2 remains unencrypted to allow the person 150-2 to view his/her own identity and to decide whether the person 150-2 wants his/her identity to be decrypted by the second agency 130 for the specific purpose indicated by the second agency 130. Further, in the third encrypted version of the image 145-1, the region 152-1 within the image 145-1 capturing the identity of the person 150-1 is encrypted to prevent the identity of the person 150-1 from being revealed to the person 150-2. In accordance with some embodiments, the request transmitted (at block 540) from the anonymization server 110 to the person 150-1 or 150-2 may include an address (instead of the encrypted versions of the image or video 145) of a database (e.g., database 140) in which the second or third encrypted versions of the image or video 145 are stored.

In any case, when the anonymization server 110 receives a response from person 150, the anonymization server 110 determines whether the response indicates a permission from person 150 (e.g., person 150-1 or person 150-2) to deanonymize the identity of the person 150. At block 550, when the response indicates a permission from person 150 to deanonymize the identity of the person 150, the anonymization server 110 transmits a response including the encryption key (e.g., encryption key used to encrypt the region 152-1 corresponding to person 150-1 captured within an image 145-1 shown in FIG. 7) to the computing device 132 associated with the second agency 130. Alternatively, for example, when a response received from the person 150-1 indicates that the person 150-1 is not providing a permission to deanonymize the identity of the person 150-1 or when no response is received from the person 150-1 within a given time period (e.g., within a predefined time period since the transmission of request to person 150-1 at block 540), the anonymization server 110 transmits a response declining to share the encryption key (e.g., encryption key used to encrypt the region 152-1 corresponding to person 150-1 captured within an image 145-1 shown in FIG. 7) to the computing device 132 associated with the second agency 130.

In accordance with some embodiments, the anonymization server 110 repeats the functions described with reference to blocks 510 through 550 of the process 500 for each additional image or video 145 (e.g., video 145-2) shared by the first agency 120 with the second agency 130. Also, the anonymization server 110 repeats the functions described with reference to blocks 510 through 550 of the process 500 to separately contact and obtain permissions from each additional person (e.g., person 150-2) whose identity may be captured in another region (e.g., region 152-2) within the same image or video 145.

In accordance with embodiments, the computing device 132 associated with the second agency 130 receives the encryption key and decrypts the particular region in the encrypted version of the image or video 145 shared by the first agency 120 using the encryption key to deanonymize the identity of the person 150. For example, when the encrypted version of the image 145-1 shown in FIG. 7 is shared by the first agency 120 with the second agency 130, the computing device 132 associated with the second agency 130 may receive a first encryption key corresponding to region 152-1 and a second encryption key corresponding to region 152-2. In this case, the computing device 132 decrypts the region 152-1 with the first encryption key to deanonymize or reveal the identity of the person 150-1. Similarly, the computing device 132 decrypts the region 152-2 with the second encryption key to deanonymize or reveal the identity of person 150-2. In accordance with some embodiments, the computing device 132 may further publish the image 145-1 on a media platform (e.g., as indicated in the request transmitted at block 520). The identities of persons 150-1 and 150-2 may further be revealed in the image 145-1 published on the media platform.

While embodiments of the present disclosure are described with examples relating to images captured corresponding to public-safety related incident scenes, embodiments of the present disclosure can be also readily adapted for non-public safety use cases such as manufacturing and retail environments where there may be a need to provide anonymization service corresponding to sharing of images or videos captured in manufacturing and retail environments.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing an anonymization service for sharing images or videos capturing identity of persons, the method comprising:

receiving, at an anonymization server, from a computing device associated with a first agency, a first request to provide an anonymization service corresponding to an encrypted version of an image or a video to be shared by the first agency with a second agency, the first request including information corresponding to: (i) an identifier uniquely identifying the image or the video, (ii) a particular region within an unencrypted version of the image or the video in which an identity of a person is captured, (iii) an encryption key used by the first agency to encrypt the particular region of the unencrypted version of the image or the video to anonymize the identity of the person in the encrypted version of the image or the video, and (iv) contact information associated with the person;

receiving, at the anonymization server, from a computing device associated with the second agency, a second request to share the encryption key for decrypting the particular region in the encrypted version of the image or the video shared by the first agency with the second agency, the second request including information corresponding to the identifier uniquely identifying the image or the video and the particular region within the image or the video;

determining, at the anonymization server, that the identifier included in the second request received from the computing device associated with the second agency matches with the identifier included in the first request received from the computing device associated with the first agency, and responsively retrieving, from the information included in the first request, the contact information associated with the person based on the information included in the second request corresponding to the particular region;

transmitting, at the anonymization server, based on the contact information associated with the person, a third request to the person to provide a permission to deanonymize the identity of the person captured in the image or the video; and transmitting, at the anonymization server, a response including the encryption key to the computing device associated with the second agency when a response indicating a permission is received from the person.

2. The method of claim 1, wherein the second request received from the computing device associated with the second agency further includes information corresponding to a media platform associated with the second agency in which the image or the video capturing the identity of the person will be published, the method comprising:
including in the third request transmitted to the person, information corresponding to the media platform associated with the second agency in which the image or the video capturing the identity of the person will be published.

3. The method of claim 1, wherein the second request received from the second agency further includes a text description indicating a purpose for which the second agency is requesting to decrypt the particular region of the encrypted version of the image or the video, the method comprising:
including in the third request transmitted to the person, the text description indicating the purpose for which the second agency is requesting to decrypt the particular region of the encrypted version of the image or the video.

4. The method of claim 1, further comprising:
transmitting a response declining to share the encryption key to the computing device associated with the second agency when a response received from the person indicates that the person is not providing a permission to deanonymize the identity of the person or when no response is received from the person within a given time period.

5. The method of claim 1, further comprising:
generating, at the anonymization server or the computing device associated with the second agency, a second encrypted version of the image or the video, wherein the identity of the person is deanonymized in the second encrypted version of the image or the video by not encrypting the particular region in the image or the video capturing the identity of the person and further wherein an identity of any person other than the person is anonymized in the second encrypted version of the image or the video by encrypting another region in the image or the video capturing the identity of any person other than the person using a different encryption key.

6. The method of claim 5, wherein the third request transmitted to the person to provide a permission includes one of: (i) the second encrypted version of the image or the video; or (ii) an address to a database in which the second encrypted version of the image or the video is stored.

7. The method of claim 5, further comprising
receiving, at the computing device associated with the first agency, the first request to share the image or the video with the second agency;
determining, at the computing device associated with the first agency, based on analyzing the image or the video via an image or video analytics engine, that the identity of the person is captured in the particular region of the image or the video;
assigning, at the computing device associated with the first agency, the encryption key to anonymize the identity of the person;
encrypting, at the computing device associated with the first agency, the particular region of the image or the video with the encryption key to generate the encrypted version of the image or the video; and
sharing the encrypted version of the image or the video with the second agency.

8. The method of claim 7, further comprising:
prior to sharing the encrypted version of the image or the video with the second agency, transmitting, from the computing device associated with the first agency to the anonymization server, the first request to provide the anonymization service corresponding to the encrypted version of the image or the video.

9. The method of claim 1, wherein the first request further includes information corresponding to: (i) a particular second region within the unencrypted version of the image or the video in which an identity of a second person is captured, (ii) a second encryption key used by the computing device associated with the first agency to encrypt the particular second region of the unencrypted version of the image or the video to anonymize the identity of the second person in the encrypted version of the image or the video, and (iii) contact information associated with the second person, the method comprising:
receiving, at the anonymization server, from the computing device associated with the second agency, a fourth request to provide the second encryption key for decrypting the particular second region in the encrypted version of the image or the video shared by the first agency with the second agency, the fourth request including information corresponding to the identifier uniquely identifying the image or the video and the particular second region within the image or the video;
determining, at the anonymization server, that the identifier included in the fourth request received from the second agency matches with the identifier included in the first request received from the first agency, and responsively retrieving, from the information included in the first request, the contact information associated with the second person based on the information included in the fourth request corresponding to the particular second region;
transmitting, at the anonymization server, based on the contact information associated with the second person, a fifth request to the second person to provide a permission to deanonymize the identity of the second person captured in the image or the video to the second agency; and
transmitting, at the anonymization server, a response including the second encryption key to the computing device associated with the second agency when a response indicating a permission is received from the second person.

10. The method of claim 9, further comprising:
transmitting a response declining to share the second encryption key to the computing device associated with the second agency when a response received from the second person indicates that the second person is not providing a permission to deanonymize the identity of the second person or when no response is received from the second person within a given time period.

11. The method of claim 1, further comprising:
receiving, at the computing device associated with the second agency, the encryption key; and
decrypting the particular region in the encrypted version of the image or the video shared by the first agency using the encryption key to deanonymize the identity of the person.

12. An anonymization server, comprising:
a communications unit; and
an electronic processor communicatively coupled to the communications unit, the electronic processor configured to:
receive, via the communications unit, from a computing device associated with a first agency, a first request to provide an anonymization service corresponding to an encrypted version of an image or a video to be shared by the first agency with a second agency, the first request including information corresponding to: (i) an identifier uniquely identifying the image or the video, (ii) a particular region within an unencrypted version of the image or the video in which an identity of a person is captured, (iii) an encryption key used by the first agency to encrypt the particular region of the unencrypted version of the image or the video to anonymize the identity of the person in the encrypted version of the image or the video, and (iv) contact information associated with the person;
receive, at the anonymization server, from a computing device associated with the second agency, a second request to share the encryption key for decrypting the particular region in the encrypted version of the image or the video shared by the first agency with the second agency, the second request including information corresponding to the identifier uniquely identifying the image or the video and the particular region within the image or the video;
determine that the identifier included in the second request received from the computing device associated with the second agency matches with the identifier included in the first request received from the computing device associated with the first agency, and responsively retrieve, from the information included in the first request, the contact information associated with the person based on the information included in the second request corresponding to the particular region;
transmit, via the communications unit, based on the contact information associated with the person, a third request to the person to provide a permission to deanonymize the identity of the person captured in the image or the video; and
transmit, via the communications unit, a response including the encryption key to the computing device associated with the second agency when a response indicating a permission is received from the person.

13. The anonymization server of claim 12, wherein the second request received from the computing device associated with the second agency further includes information corresponding to a media platform associated with the second agency in which the image or the video capturing the identity of the person will be published, wherein the electronic processor is configured to include in the third request transmitted to the person, information corresponding to the media platform associated with the second agency in which the image or the video capturing the identity of the person will be published.

14. The anonymization server of claim 12, wherein the second request received from the second agency further includes a text description indicating a purpose for which the second agency is requesting to decrypt the particular region of the encrypted version of the image or the video, wherein the electronic processor is configured to include in the third request transmitted to the person, the text description indicating the purpose for which the second agency is requesting to decrypt the particular region of the encrypted version of the image or the video.

15. The anonymization server of claim 12, wherein the electronic processor is configured to transmit, via the communications unit, a response declining to share the encryption key to the computing device associated with the second agency when a response received from the person indicates that the person is not providing a permission to deanonymize the identity of the person or when no response is received from the person within a given time period.

16. The anonymization server of claim 12, wherein the electronic processor is configured to generate a second encrypted version of the image or the video, wherein the identity of the person is deanonymized in the second encrypted version of the image or the video by not encrypting the particular region in the image or the video capturing the identity of the person and further wherein an identity of any person other than the person is anonymized in the second encrypted version of the image or the video by encrypting another region in the image or the video capturing the identity of any person other than the person using a different encryption key.

17. The anonymization server of claim 16, wherein the third request transmitted to the person to provide a permission includes one of: (i) the second encrypted version of the image or the video; or (ii) an address to a database in which the second encrypted version of the image or the video is stored.

18. A method for requesting an anonymization service for sharing images or videos capturing identity of persons, the method comprising:
receiving, at a computing device associated with a first agency, a first request to share an image or a video with a second agency;
determining, at the computing device, based on analyzing the image or the video via an image or video analytics engine, that a particular region of the image or the video captures an identity of a person;
assigning, at the computing device, an encryption key to anonymize the identity of the person;
encrypting, at the computing device, the particular region of the image or the video with the encryption key to generate an encrypted version of the image or the video;
transmitting, at the computing device, a second request to an anonymization server to provide an anonymization service corresponding to the encrypted version of the image or the video, the second request including information corresponding to: (i) an identifier uniquely identifying the image or the video, (ii) the particular region of the image or the video in which the identity of the person is captured, (iii) the encryption key used by the computing device to encrypt the particular region of the image or the video to anonymize the identity of the person in the encrypted version of the image or the video, and (iv) contact information associated with the person;
receiving, at the computing device, a confirmation from the anonymization server to provide the anonymization service corresponding to the encrypted version of the image or the video; and
sharing the encrypted version of the image or the video with the second agency.

19. The method of claim 18, further comprising:
- determining, at the computing device, based on analyzing the image or the video via the image or the video analytics engine, that a particular second region of the image or the video captures an identity of a second person;
- assigning, at the computing device, a second encryption key to anonymize the identity of the second person; and
- encrypting, at the computing device, the particular second region of the image or the video with the second encryption key to generate the encrypted version of the image or the video.

20. The method of claim 19, wherein the second request to the anonymization server to provide the anonymization service further includes information corresponding to: (i) the particular second region of the image or the video in which the identity of the second person is captured, (ii) the second encryption key used by the computing device to encrypt the particular second region of the image or the video to anonymize the identity of the second person in the encrypted version of the image or the video, and (iii) contact information associated with the second person.

* * * * *